United States Patent
Rietman et al.

(10) Patent No.: US 9,356,696 B2
(45) Date of Patent: May 31, 2016

(54) MODULATION FOR CODED LIGHT TRANSMISSION

(75) Inventors: Ronald Rietman, Eindhoven (NL); Constant Paul Marie Jozef Baggen, Blerick (NL); Hendricus Theodorus Gerardus Maria Penning De Vries, Mierlo (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 147 days.

(21) Appl. No.: 13/879,253

(22) PCT Filed: Oct. 19, 2011

(86) PCT No.: PCT/IB2011/054652
§ 371 (c)(1),
(2), (4) Date: Apr. 12, 2013

(87) PCT Pub. No.: WO2012/052935
PCT Pub. Date: Apr. 26, 2012

(65) Prior Publication Data
US 2013/0202310 A1 Aug. 8, 2013

(30) Foreign Application Priority Data

Oct. 20, 2010 (EP) .................................... 10188143
Apr. 7, 2011 (EP) .................................... 11161522

(51) Int. Cl.
*H04B 10/116* (2013.01)
*H05B 37/02* (2006.01)

(52) U.S. Cl.
CPC .......... *H04B 10/116* (2013.01); *H05B 37/0272* (2013.01)

(58) Field of Classification Search
CPC .................................................. H04B 10/116
See application file for complete search history.

(56) References Cited

U.S. PATENT DOCUMENTS

| 4,334,250 A | 6/1982 | Theus |
| 6,198,230 B1 * | 3/2001 | Leeb et al. .................... 315/224 |

FOREIGN PATENT DOCUMENTS

| DE | 202006008040 A1 | 8/2007 |
| DE | 102006037042 A1 | 2/2008 |
| JP | 2010056644 A | 3/2010 |
| WO | 9953633 A1 | 10/1999 |
| WO | 2009010916 A2 | 1/2009 |
| WO | 2009040718 A2 | 4/2009 |

(Continued)

OTHER PUBLICATIONS

Tiffany K. Buffaloe et al; "Fiat Lux: A Fluorescent Lamp Transceiver", IEEE APEC, 1997, vol. 2, pp. 1037-1041.

Deron K. Jackson et al; "Fiat Lux: A Fluorescent Lamp Digital Transceiver", IEEE Transactions on Industry Applications, vol. 34, No. 3, May/Jun. 1998, pp. 625-630.

(Continued)

*Primary Examiner* — Nathan Curs
(74) *Attorney, Agent, or Firm* — Meenakshy Chakravorty

(57) ABSTRACT

Coded light has been proposed to enable advanced control of light sources and transmit information using light sources. Sequences of channel symbols to drive the light source are determined from sequences of source symbols such that no visible flicker is present in coded light emitted by the light sources. Each source symbol is mapped to a composite channel symbol comprising at least one first channel symbol which may be identical to the current source symbol and at least one second channel symbol which may be a function of the current source symbol and at least one future and/or past source symbol.

18 Claims, 12 Drawing Sheets

(56) References Cited

FOREIGN PATENT DOCUMENTS

| WO | WO2009/040718 | * | 4/2009 | ............ H05B 37/02 |
| WO | 2009090511 A2 | | 7/2009 | |
| WO | WO2009/090511 | * | 7/2009 | ......... H05B 33/0818 |
| WO | 2010044635 A2 | | 4/2010 | |

OTHER PUBLICATIONS

Bergmann, E., et al, "Half Weight Block Codes for Optical Communications," AT&T Technical Journal, American Telephone and Telegraph Co., NY, vol. 65, No. 3, May 1986 (9 pages).

* cited by examiner

MODULATION FOR CODED LIGHT TRANSMISSION

FIELD OF THE INVENTION

The present invention relates to a coded light system. Particularly it relates to methods and devices for driving at least one light source arranged to emit coded light in a coded light system and for decoding such coded light into an information sequence.

BACKGROUND OF THE INVENTION

Light sources are nowadays applied in lighting systems consisting of a large number of light sources. Since the introduction of solid state lighting several parameters of these light sources can be varied and controlled in a system of light sources. Such parameters include light intensity, light color, light color temperature and even light direction. By varying and controlling these parameters of the different light sources, a light designer or user of the system is enabled to generate lighting scenes. This process is often referred to as scene setting, and is typically quite a complex process due to the multitude of light sources and parameters to be controlled. Typically one controller, or control channel, is required for each light source. This makes it difficult to control a system of more than ten light sources.

To enable a more intuitive and simpler control of the light sources, and to create scenes, the embedding of information sequences such as invisible identifiers in the light output of luminaires has been previously proposed. This embedding of identifiers can be based on unique modulation of the visible light (VL) of the luminaire or by placing of an additional infra-red (IR) light source in the luminaire and uniquely modulate this IR light. The Manchester code is commonly used as a means to modulate the coded light.

The embedding of identifiers in the light will be referred to as coded light (CL). Communication utilizing CL will be referred to as visible light communications (VLC). For the transmission of CL, mostly, light emitting diodes (LEDs) are considered, which allow for a reasonable high modulation frequency and bandwidth. This in turn may result in a fast response of the control system. The identifiers can, however, also be embedded in the light of other light sources, such as incandescent, halogen, fluorescent and high-intensity discharge (HID) lamps. These light source identifiers, also referred to as codes, allow for the identification and strength estimation of the individual local illumination contributions. This can be applied in light control applications such as commissioning, light source selection and interactive scene setting. These applications have use in, for example, homes, offices, shops and hospitals. These light source identifiers hence enable a simple and intuitive control operation of a light system, which might otherwise be very complex.

SUMMARY OF THE INVENTION

In view of the above it is desirable that the embedding of coded information (e.g., packets) in the light output of a light source is invisible to the users that are interested in the illumination function of a light source. In other words, it may be desirable that the coding of the light does not lead to visible flicker. This requirement implies that the spectrum of the modulation code should not contain low frequencies. As light sources connected to the usual power grid commonly produce a strong interference e.g. at DC, 50 Hz or 100 Hz, it may be advantageous to suppress that interference by appropriate filtering at the receiver. In order to not degrade the wanted signal too much by this filtering, it is advantageous if the wanted signal is absent at those locations of the spectrum where interference exists. This consideration also implies that the spectrum of the modulation code should not contain low frequencies. It may also be desirable that the spectrum of the modulation code does not contain high frequencies for the reason that circuits in cheap drivers for an LED light source for such high frequencies may be difficult to realize.

It is also desirable, at the receiver side, to be able to detect the digital information comprised in the VLC, even in the presence of interference from other light sources like e.g. the sun, a fluorescent bulb or tube, incandescent light, etc. It may therefore be desirable that the spectrum of the modulated signal does not contain any contribution at frequency locations of the spectrum where such interference exists.

It is an object of the present invention to overcome these problems, and to provide methods, devices and system concepts which solve or at least mitigate the issues addressed above; for example by providing methods, devices and system concepts allows for a better spectral confinement, in particular for the low frequencies, than state of the art, whilst having a comparable complexity.

Generally, the above objectives are achieved by methods and devices according to the attached independent claims.

According to a first aspect, the above objects are achieved by a light driver for driving at least one light source arranged to emit coded light based on a control signal, the light driver comprising a receiver arranged to receive a sequence $u=[u_1, \ldots, u_k, \ldots, u_K]$ of source symbols $u_k$ representing an information sequence of an information source; a processing unit arranged, from the sequence of source symbols, to determine a sequence $z=[z_1, \ldots, z_k, \ldots, z_K]$ of channel symbols $z_k$ forming the control signal; a transmitter arranged to provide the at least one light source with the control signal thereby driving the at least one light source; wherein the processing unit is arranged to determine the sequence of channel symbols z by mapping each source symbol $u_k$ at time k to a composite channel symbol $z_k=(z_{k,1}, z_{k,2})$ comprising at least one first channel symbol $z_{k,1}$, one of which is identical to $u_k$, and at least one second channel symbol $z_{k,2}$ chosen from a set M, wherein $z_{k,2}$ is a function of the source symbol $u_k$ and at least one future and/or past source symbol $u_i$, $i \neq k$, the mapping resulting in that the power spectral density at frequency zero of the sequence z of channel symbols is equal to zero, and wherein the control signal thereby enables no visible flicker to be present in coded light emitted by the at least one light source.

The proposed mappings allow for a better spectral confinement, in particular for the low frequencies, than for example the Manchester pulse, whilst having a comparable complexity.

The symbol $z_{k,2}$ may be a signed weighted average of L terms $u_{k-l+1}+u_{k+l}$ for $l=1, \ldots L$, resulting in that the power spectral density of the sequence z of channel symbols decays as $(fT)^{(4L)}$, where f denotes frequency in Hz and where T denotes the time in seconds for transmitting $u_k$. The spectrum of Manchester coding decays as $f^2$ for f close to zero. Thus the proposed coding scheme decays faster than Manchester coding.

According to a second aspect, the above objects are achieved by a luminaire comprising at least one light source, modulation means and a light driver according to the above, the modulation means being arranged, according to the control signal provided by the light driver, to modulate coded light to be emitted by the at least one light source.

According to a third aspect, the above objects are achieved by a method for driving at least one light source arranged to emit coded light based on a control signal, the method comprising receiving a sequence $u=[u_1, \ldots, u_k, \ldots, u_K]$ of source symbols $u_k$ representing an information sequence of an information source; determining a sequence $z=[z_1, \ldots, z_k, \ldots, z_K]$ of channel symbols $z_k$ forming the control signal from the sequence of source symbols; providing the at least one light source with the control signal, thereby driving the at least one light source; wherein the sequence of channel symbols z is determined by mapping each source symbol $u_k$ at time k to a composite channel symbol $z_k=(z_{k,1}, z_{k,2})$ comprising at least one first channel symbol $z_{k,1}$, one of which is identical to $u_k$, and at least one second channel symbol $z_{k,2}$ chosen from a set M, wherein $z_{k,2}$ is a function of the source symbol $u_k$ and at least one future and/or past source symbol $u_i$, $i \neq k$, the mapping resulting in that the power spectral density at frequency zero of the sequence z of channel symbols is equal to zero, and wherein the control signal thereby enables no visible flicker to be present in coded light emitted by the at least one light source.

According to a fourth aspect, the above objects are achieved by an information decoder for decoding an information sequence from a signal received from a light detector, the signal being indicative of coded light as emitted from at least one light source driven by a light driver according to the above, comprising a receiver arranged to receive the signal from the light detector, the signal being indicative of the sequence $z=[z_1, \ldots, z_k, \ldots, z_K]$ of channel symbols $z_k=(z_{k,1}, z_{k,2})$; a processing unit arranged to determine, from the signal, a sequence $\hat{u}=[\hat{u}_1, \ldots, \hat{u}_k, \ldots, \hat{u}_K]$ of decoded source symbols $\hat{u}_k$ forming the decoded information sequence; wherein the processing unit is arranged to determine the sequence of decoded source symbols $\hat{u}$ whereby the decoded source symbol $\hat{u}_k$ is determined from a difference between $z_{k,1}$ and a weighted average of at least the channel symbol $z_{k,2}$ and one future and/or past channel symbol $z_i$, $i \neq k$.

The processing unit may comprise a hard decision decoder. The hard decision decoder may be arranged to determine the sequence of decoded source symbols $\hat{u}$ as the sign of said difference. Such a decoder may allow for fast and accurate decoding.

According to a fifth aspect, the above objects are achieved by an information decoder for decoding an information sequence from a signal received from a light detector, the signal being indicative of coded light as emitted from at least one light source driven by a light driver according to the above, comprising: a receiver arranged to receive the signal from the light detector, the signal being indicative of the sequence $z=[z_1, \ldots, z_k, \ldots, z_K]$ of channel symbols $z_k=(z_{k,1}, z_{k,2})$; a processing unit arranged to determine, from the signal, a sequence $\hat{u}=[\hat{u}_1, \ldots, \hat{u}_k, \ldots, \hat{u}_K]$ of decoded source symbols $\hat{u}_k$ forming the decoded information sequence; wherein the processing unit is arranged to determine the sequence of decoded source symbols $\hat{u}$ whereby the decoded source symbol $\hat{u}_k$ is determined by taking linear combinations of $z_{l,1}$, and half symbols $z_{l,2,L}$ and $z_{l,2,R}$, for values of l in a neighborhood of k, where $z_{k,2,L}$ is the first half of $z_{k,2}$ and $z_{k,2,R}$ is the second half of $z_{k,2}$.

The processing unit may be arranged to determine the sequence of decoded source symbols $\hat{u}$ by using a matched filter having a set of coefficients comprising the sequence $[-1,0,1,1]$ in terms of the half symbols. According to an embodiment the matched filter has 2N+4 coefficients in terms of the half symbols, starting with the sequence $[-1,0]$, followed by N pairs of coefficients alternating between $[1,1]$ and $[-1,-1]$ until the N-th pair which equals $[(-1)^{N-1}, (-1)^{N-1}]$, and ending with the sequence $[0, (-1)^N]$.

It is noted that the invention relates to all possible combinations of features recited in the claims. Likewise, the advantages of the first aspect applies to the second aspect, the third aspect, the fourth aspect and the fifth aspect, and vice versa.

BRIEF DESCRIPTION OF THE DRAWINGS

The above and other aspects of the present invention will now be described in more detail, with reference to the appended drawings showing embodiment(s) of the invention.

DETAILED DESCRIPTION

The below embodiments are provided by way of example so that this disclosure will be thorough and complete, and will fully convey the scope of the invention to those skilled in the art. Like numbers refer to like elements throughout.

Figure 1:
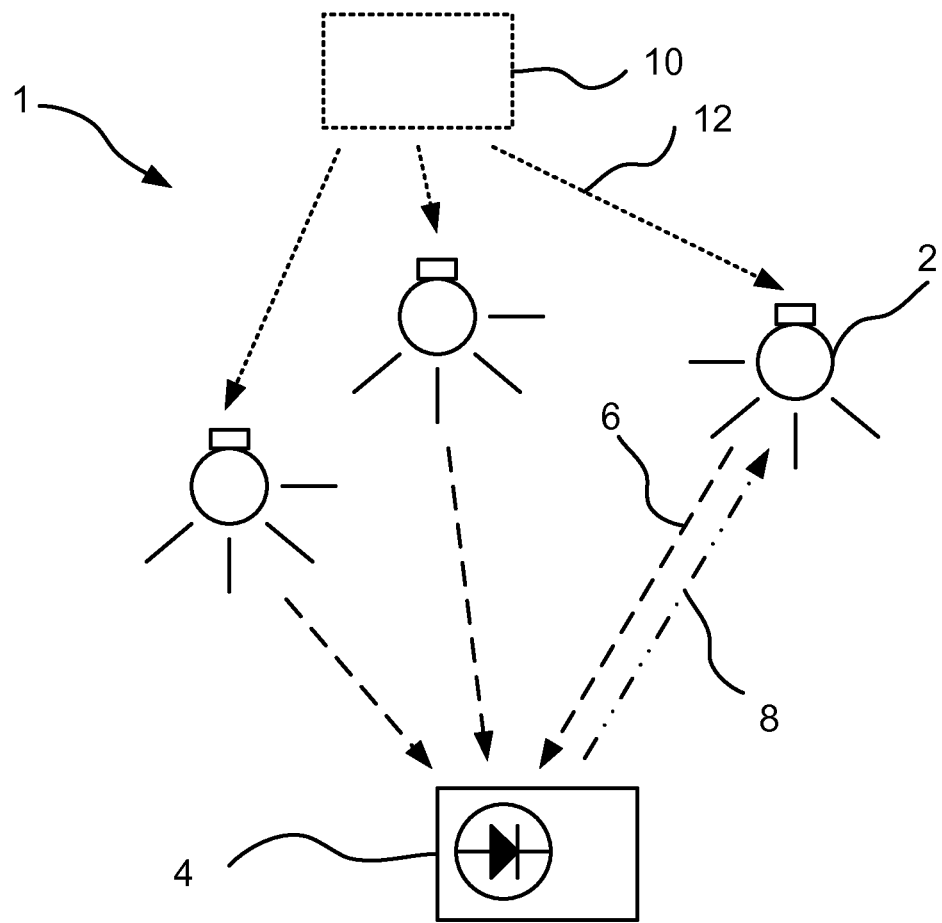
FIG. 1 illustrates a lighting system according to an embodiment.

FIG. 1 illustrates a lighting system 1 comprises at least one light source, schematically denoted by the reference numeral 2. The at least one light source 2 may be a luminaire and/or be part of a lighting control system, thus the lighting system 1 may be denoted as a coded lighting system. A luminaire may comprise at least one light source 2. The term "light source" means a device that is used for providing light in a room, for purpose of illuminating objects in the room. A room is in this context typically an apartment room or an office room, a gym hall, a room in a public place or a part of an outdoor environment, such as a part of a street. Each light source 2 is capable of emitting coded light, as schematically illustrated by the arrow 6. The emitted light thus comprises a modulated part associated with coded light comprising information sequences. The emitted light may also comprise an un-modulated part associated with an illumination contribution. Each light source 2 may be associated with a number of lighting settings, inter alia pertaining to the illumination contribution of the light source, such as color, color temperature and intensity of the emitted light. In general terms the illumination contribution of the light source may be defined as a time-averaged output of the light emitted by the light source 2. The light source 2 will be further described with reference to FIG. 2.

As noted above the at least one light source 2 emit information sequences via the visible light 6. Before the information sequences is emitted via the visible light 6 it is mapped to a sequence of channels symbols to form a modulated signal. This modulation signal may then act as a control signal to drive the at least one light source. The control signal may thereby determine the pulse train which switches the at least one light source 2 between emitting light (in an "ON"-state) and not emitting light (in an "OFF"-state).

Figure 3:
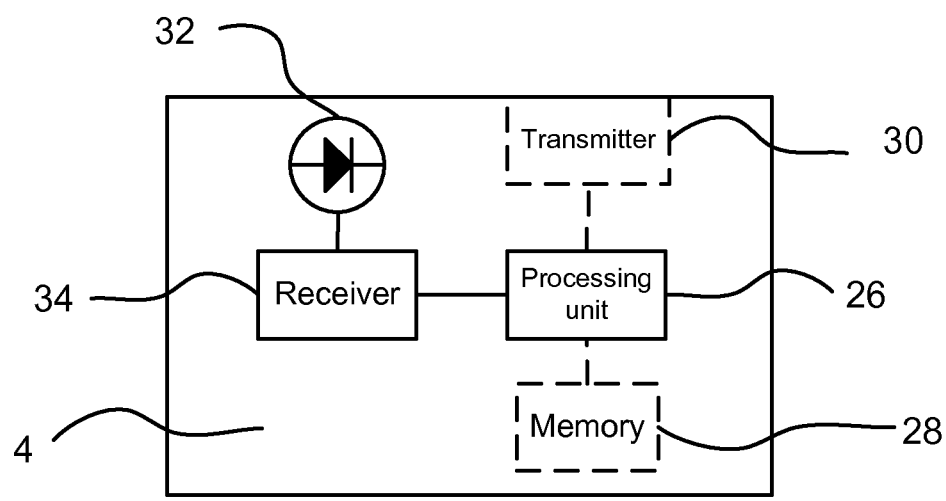
FIG. 3 illustrates an information decoder according to an embodiment.

The lighting system 1 further comprises an apparatus, termed an information decoder 4. The information decoder 4 is arranged to decode an information sequence from coded light emitted by the at least one light source 2. The information decoder 4 will be further described with reference to FIG. 3.

The lighting system 1 may further comprise other devices 10 arranged to control and/or provide information to the at least one light source 2.

Figure 2:
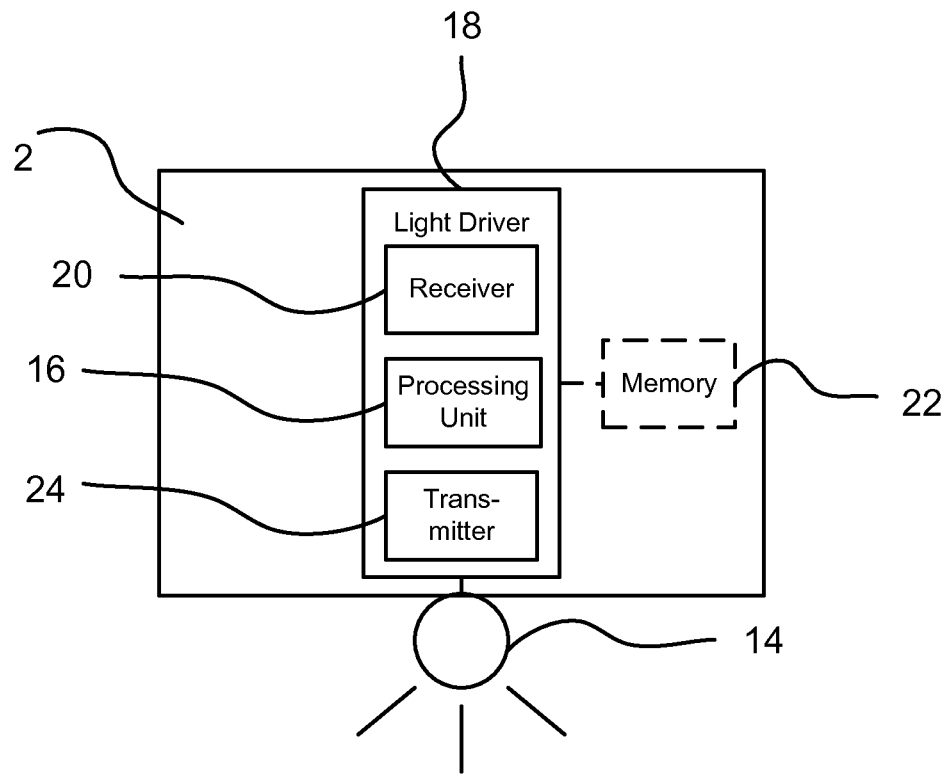
FIG. 2 illustrates a light source according to an embodiment.

FIG. 2 schematically illustrates, in terms of a number of functional blocks, a light source 2. The light source 2 comprises an emitter 14 for emitting coded light. The emitter 14 may comprise one or more LEDs, but it could as very well comprise one or more FL or HID sources, etc. In general, the coding schemes may utilize multiple light sources. For example, a 3-level coding scheme may have two LEDs using the mappings (OFF, OFF) for the level "−A", (ON, OFF) for the level "0", and (ON, ON) for the level "+A". How the levels are determined is disclosed below. The emitter is controlled by a light driver 18. The light driver 18 may comprise or be part of a processing unit 16 such as a central processing unit (CPU). As such the light driver 18 comprises a receiver 20 and a transmitter 24. The receiver 20 may be arranged to receive settings, control information, code parameters and the like. The receiver 20 may be a receiver configured to receive coded light. The receiver 20 may comprise an infrared interface for receiving infrared light. Alternatively the receiver 20 may be a radio receiver for receiving wirelessly transmitted information. Yet alternatively the receiver 20 may comprise a connector for receiving information transmitted by wire. The wire may be a powerline cable. The wire may be a computer cable. Information pertaining to settings, control information, code parameters and the like may be stored in the memory 22.

Figure 8A:
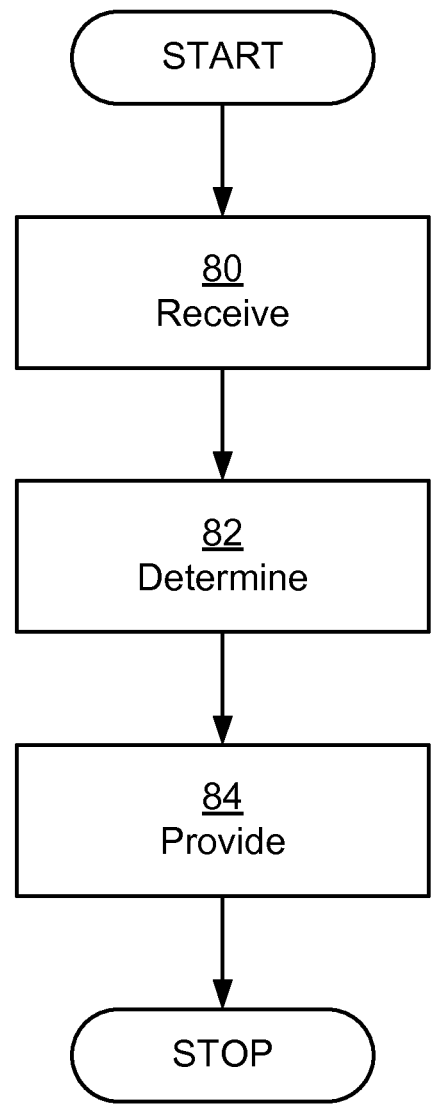
FIGS. 8a-8b are flowcharts according to embodiments.

The light driver 18 may receive information via the receiver 20 pertaining to an information sequence to be transmitted by means of coded light by the light source 2. By e.g. utilizing the processing unit 16 the light driver 18 may change the encoding of the coded light such that the coded light emitted by the emitter 14 comprises (an encoded version of) the information sequence. In order to achieve such a transmission the light driver 18 may be arranged to perform a number of functionalities. For example the receiver 20 is arranged to receive a sequence $u=[u_1, \ldots, u_k, \ldots, u_K]$ of source symbols $u_k$ representing an information sequence of an information source. The processing unit 16 is arranged to determine, from the sequence of source symbols, a sequence $z=[z_1, \ldots, z_k, \ldots, z_K]$ of channel symbols $z_k$ forming a control signal. The transmitter 24 is arranged to provide the light source 2 with the control signal and thereby drive the light source 2. These functionalities will be described in more detail below with reference to the flowchart of FIG. 8a. Alternatively, the light source 2 does not comprise a light driver. The light driver 18 may then be part of the lighting system 1.

Figure 8B:
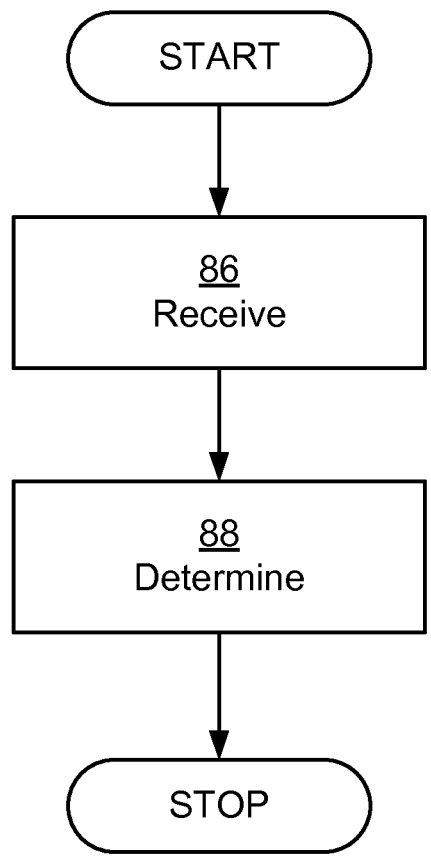

The information decoder 4 may be arranged to detect and receive light, such as the coded light, comprising information sequences emitted by the at least one light source 2 as well as the light emitted by light sources outside the lighting system 1 (not shown). From the detected and received light the receiver 4 is arranged to determine information sequences transmitted by the at least one light sources 2. A functional block diagram for an information decoder 4 according to an embodiment of the present invention is given in FIG. 3. The information decoder 4 comprises a receiver 34 arranged to receive the signal from a light detector 32, the signal being indicative of the sequence $z=[z_1, \ldots, z_k, \ldots, z_K]$ of channel symbols $z_k=(z_{k,1}, z_{k,2})$. The information decoder 4 further comprises a processing unit 26 arranged to determine, from the signal, a sequence $\hat{u}=[\hat{u}_1, \ldots, \hat{u}_k, \ldots, \hat{u}_K]$ of decoded source symbols $\hat{u}_k$ forming the decoded information sequence. In order to achieve such a determination, the information decoder 4 may be arranged to perform a number of functionalities. These functionalities will be described below with reference to the flowchart of FIG. 8b. The information decoder 4 may further comprise a memory 28 and a transmitter 30. The memory 28 may store instructions pertaining to the functionalities to estimate an information sequence. The transmitter 30 may be utilized in order to communicate information to the at least one light source 2 in the lighting system 1.

Figure 7A:
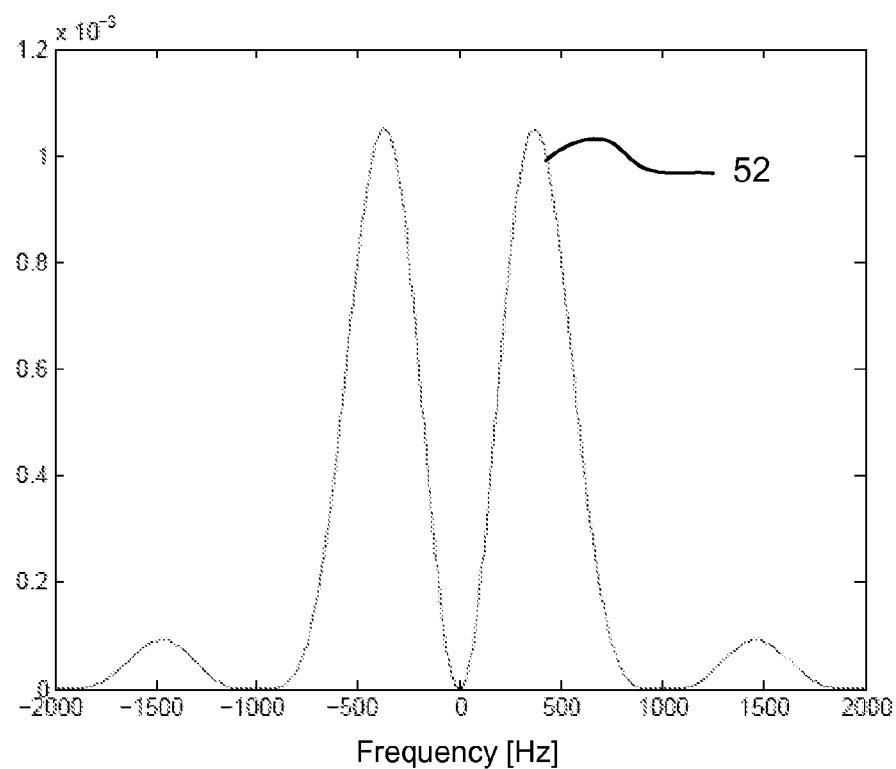
FIGS. 7a-7g illustrate spectral representations of sequences of channel symbols of according to embodiments.

As noted above, before the information sequences is emitted via the visible light 6 it is mapped to a sequence of channels symbols to form a modulated signal. The mapping involves determining a modulation scheme with which the sequence of channels symbols is to be modulated with. The Manchester code (or bi-phase code) is commonly used as a means to modulate the coded light. In Manchester coding each input bit (also called user bit) is mapped to a pair of channels symbols, wherein the channel symbols in each pair have different signs. Specifically, a "1" is mapped onto the pair $\{+1,-1\}$, while a "0" is mapped onto the pair $\{-1,+1\}$ (or vice versa). Clearly, the Manchester code is DC-free as the average transmitted amplitude is zero. FIG. 7a illustrates at reference numeral 52 a frequency representation (in the form of the power spectral density, PSD) of the transmitted waveform for an example with a communication speed of 500 user bits/s, using the Manchester code. However, due to the relatively slow decay of the PSD visible flicker may be introduced in the emitted light.

This problem can be overcome by methods, devices and system concepts as disclosed below which provide mappings from source symbols u to channel symbols z resulting in that the PSD at frequency zero of the sequence z of channel symbols is equal to zero and wherein the PSD has a faster decay than the Manchester code. The control signal (i.e. the signal based on the sequence of channel symbols generated by the light driver 18 and used to drive the at least one light source 2) thereby enables no visible flicker to be present in coded light emitted by the at least one light source 2. Means for providing such a mapping as well as decoding an information sequence which has been modulated with such a mapping will be disclosed below. In short, there is provided a set of mappings which may be regarded as modification of the Manchester modulation coding rule that translates bits to waveforms. The proposed mappings are especially useful for transmission of information embedded in light. The good low-frequency properties ensure no visible flicker, and low susceptibility to low-frequency interference. Particularly, the proposed mappings enable the "DC-free" property of the Manchester code to be improved, thus leading to much less visible flicker (or even no visible flicker at all) of the emitted coded light whilst improving the suppression of 50 Hz and 100 Hz interference at the information decoder for a given (low) bit rate due to the faster decay of the PSD. Such different aspects of a modulation system for visible light communication will be considered below.

According to a first proposed mapping each user bit $u_k$, $u_k \in \{-1,+1\}$, from a string of user bits u is mapped onto a group of two channel symbols $(z_{k,1}, z_{k,2})$, where $z_{k,1}, z_{k,2} \in \{-1,0,+1\}$, where $z_{k,2}$ depends on $u_k$ of the current group and $u_{k+1}$ of the next group. Thus the mapping for $z_{k,1}$ is defined as $z_{k,1}=u_k$ and the mapping for $z_{k,2}$ is defined as: $u_{k,2}=-(u_k 30 u_{k+1})/2$. The sequence of channel symbols z is then formed by the pairs of the two channel symbols $(z_{k,1}, z_{k,2})$. One advantage of encoding using the first proposed mapping over Manchester coding is the power spectrum, such as the power spectral density, which corresponds to the Fourier transform of the autocorrelation function of the channel sequence. For amplitude modulation with amplitude A around a mean level $A_0$ the channel symbol sequence z is transmitted with amplitude $A_0 + A \cdot z$. The power spectrum for Manchester encoding then equals $$A^2 T \sin^2(\pi f T/2) \sin c^2(fT/2)$$

where T is the user bit time. For the first proposed mapping the power spectrum is $$A^2 T \sin^4(\pi f T/2) \sin c^2(fT/2).$$

Figure 7B:
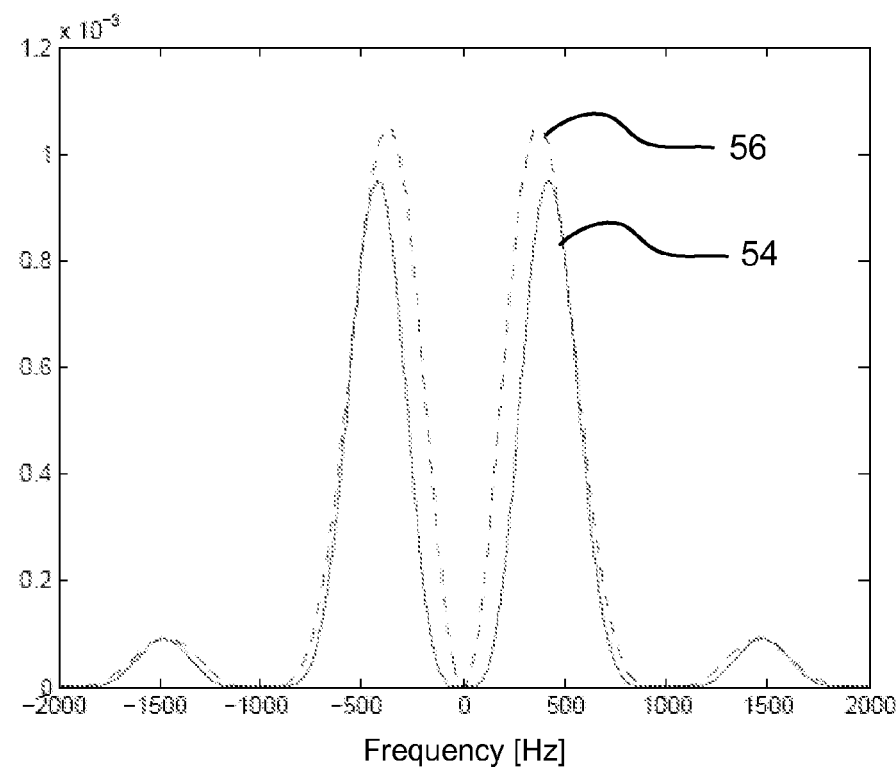

Thus the spectrum of the first proposed mapping is more strongly suppressed around frequencies that are an integer multiple of 2/T than that of Manchester encoding. In particular, for frequencies close to zero, the Manchester power spectrum is $O(f^2)$, whereas the power spectrum for the first proposed mapping is $O(f^4)$. In other words the spectrum of Manchester coding decays as $f^2$ for f close to zero whereas the spectrum coding using the first proposed mapping decays as $f^4$ for f close to zero. At reference numeral 54 of FIG. 7b, the PSD for the first proposed mapping is compared to the Manchester (bi-phase) mapping at reference numeral 56 for equal user bit rate, respectively. As can be seen in this figure the first proposed mapping has a significantly wider gap around DC (zero frequency) than the Manchester (bi-phase) mapping.

Figure 7C:
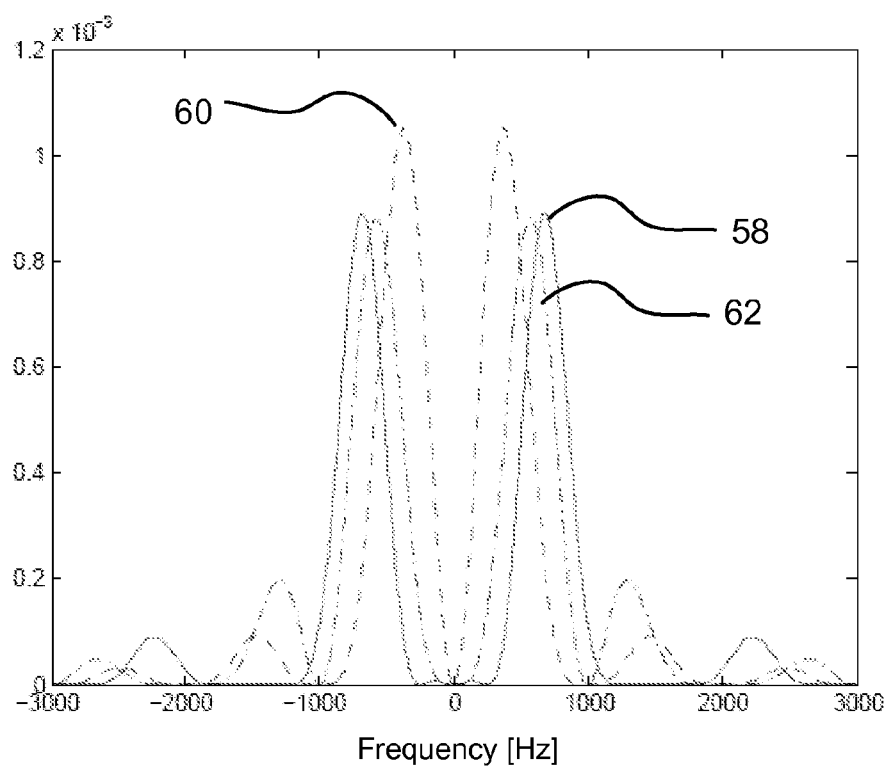
Figure 7D:
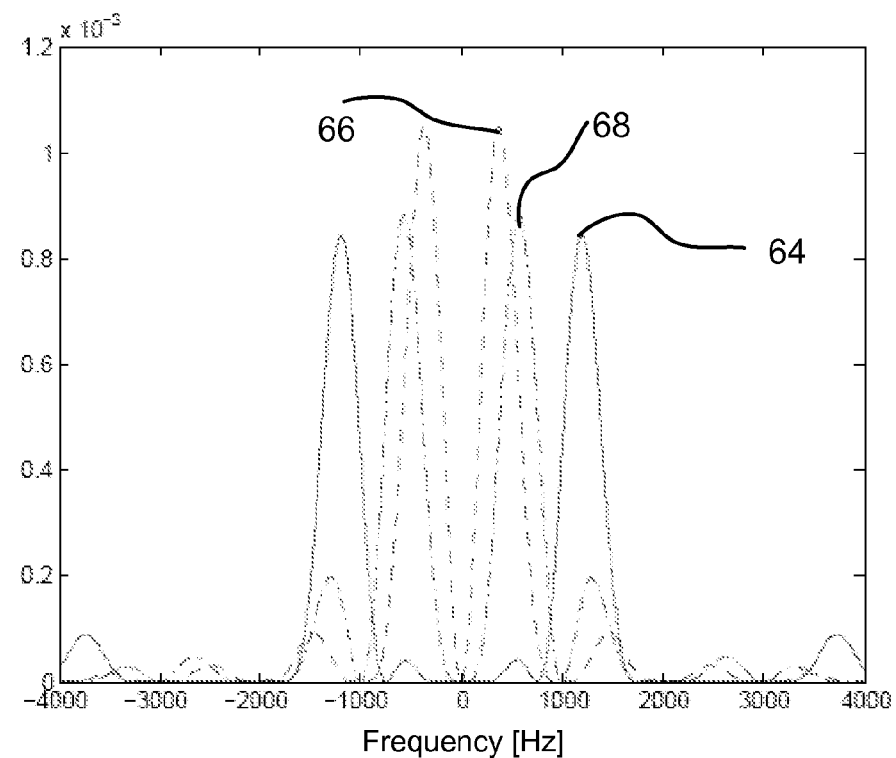

If the spectral "hole" around DC has to be widened, the first proposed mapping may be extended to a second class of proposed mappings. According to modulation using the second proposed mapping, one source bit $u_k \in \{-1,+1\}$ is mapped to a word $[z_{k,1}^1 \ldots z_{k,1}^j \ldots z_{k,1}^N, z_{k,2}]$ containing N+1 symbols, where the first N symbols are defined by: $z_{k,1}^j = (-1)^{j-1} u_k$, for j=1,..., N, and wherein $z_{k,2}$ is defined by the mapping $z_{k,2} = -(z_{k,1}^N + z_{k+1,1}^1)/2$. An effect of the second proposed mapping is that the signal band is shifted upwards in frequency, thus freeing up the low frequencies. The second proposed mapping may be regarded as a kind of phase modulation of a square carrier, where the merging symbol $z_{k,2}$ serves to "smooth" transitions for keeping the required bandwidth small. FIG. 7c shows at reference numeral 58 the PSD for the second proposed mapping for N=2 compared to the Manchester pulse at reference numeral 60 and a mapping defined as [+1, −1, −1, +1] at reference numeral 62, all for the same user bit rate of 500 bits/s. FIG. 7d shows at reference numeral 64 the PSD for the second proposed mapping for N=4, all for the same user bit rate of 500 bits/s and again compared to the Manchester pulse at reference numeral 66 and a mapping defined as [+1, −1, −1, +1] at reference numeral 68.

However, even stronger suppression than achieved by the first and second proposed mappings may be needed in some applications. The first and second proposed mappings may be further extended to a class of third proposed mappings. The class of third proposed mappings is labeled by an integer L, and involves mapping source symbols $u_k$ to 3L-valued channel symbols $z_k$. The resulting transmitted signal (when using amplitude modulation) has little power at low frequencies and decays as $(fT)^{4L}$, where f is the frequency and T the bit time. The corresponding matched filter threshold receiver has similar rejection of low-frequency interference. For L=1, the first proposed mapping is recovered. The L=2 scheme gives a nice balance between practicality and wanted low-frequency properties.

Particularly, according to the class of third proposed mappings each channel symbol $z_k$ is a pair $(z_{k,1}, z_{k,2})$ where $z_{k,1} = u_k$ and where the intermediate symbols $z_{k,2}$ will be chosen as $$z_{k,2} = -\sum_{l=1}^{L} a_{L,l}(u_{k-l+1} + u_{k+l})/2$$

where, for a given value of L, the coefficients $a_{L,l}$ are determined by the condition that $$1 - \sum_{l=1}^{L} a_{L,l} \cos((2n-1)\pi fT) = O((fT)^{2L})$$

so that the power spectrum, $$A^2 T \left( \frac{1}{2}\left(1 - \sum_{l=1}^{L} a_{L,l}\cos((2n-1)\pi fT)\right) \operatorname{sinc}(fT/2) \right)^2$$

is $O((fT)^{4L})$.

For each value of L, finding the coefficients $a_{L,l}$ is a matter of linear algebra. The results for the first few values of L are $$L = 1: z_{k,2} = -\frac{u_k + u_{k+1}}{2}$$

$$L = 2: z_{k,2} = -\frac{9}{8} \cdot \frac{u_k + u_{k+1}}{2} + \frac{1}{8} \cdot \frac{u_{k-1} + u_{k+2}}{2}$$

$$L = 3: z_{k,2} = -\frac{75}{64} \cdot \frac{u_k + u_{k+1}}{2} + \frac{25}{128} \cdot \frac{u_{k-1} + u_{k+2}}{2} - \frac{3}{128} \cdot \frac{u_{k-2} + u_{k+3}}{2}$$

$$L = 4: z_{k,2} = -\frac{1225}{1024} \cdot \frac{u_k + u_{k+1}}{2} + \frac{245}{1024} \cdot \frac{u_{k-1} + u_{k+2}}{2} - \frac{49}{1024} \cdot \frac{u_{k-2} + u_{k+3}}{2} + \frac{5}{1024} \cdot \frac{u_{k-3} + u_{k+4}}{2}.$$

The intermediate symbols $z_{k,2}$, being a weighted sum of L ternary symbols, can take on $3^L$ different values. As noted above, For L=1 the first proposed mapping is recovered. Setting L=2 gives a considerable low-frequency improvement over L=1, whilst keeping the number of levels limited to nine, namely the values in the set:

$$\left\{ -\frac{5}{4}, -\frac{9}{8}, -1, -\frac{1}{8}, 0, \frac{1}{8}, 1, \frac{9}{8}, \frac{5}{4} \right\}.$$

Since the maximum amplitude is 5/4 in this case, compared to 1 for L=1, the maximum modulation depth A for L=2 is 4/5 times the maximum amplitude for L=1.

Figure 7E:
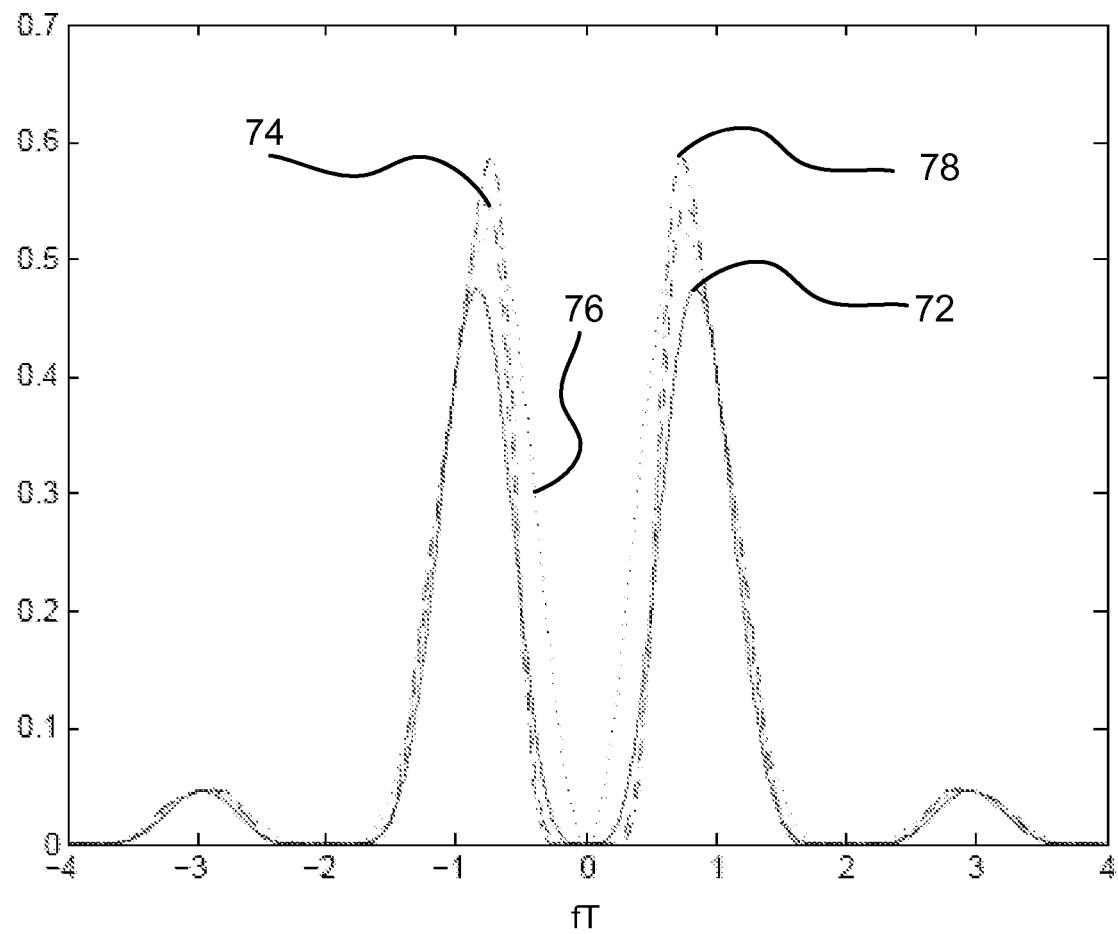

A sequence of user bits is thus converted into a sequence of channel symbols, as described above. These channel symbols are transmitted over the channel (i.e. from the at least one light source 2 to the information decoder 4) using visible light communication, for instance using amplitude modulation. At the information decoder 4, the received 'soft' symbols may be sent through a matched filter, and the estimated source sequence, or user bits, may be detected via the threshold scheme (using, for example, the sign-function), see below. FIG. 7e shows the PSD as a function of fT, divided by $A^2T$, for Manchester encoding at reference numeral 76 as well as for the third class of proposed mapping for L=1 at reference numeral 72, L=2 at reference numeral 74, and L=3 at reference numeral 78, respectively. As noted in the figure the frequency gap close to zero frequency increases as L increases.

As disclosed above, according to the first proposed mapping each user bit $u_k$, $u_k \in \{-1,+1\}$, from a string of user bits u, is mapped onto a group of two channel symbols $(z_{k,1}, z_{k,2})$, where $z_{k,1}, z_{k,2} \in \{-1,0,+1\}$. The first and second proposed mappings, for which the output waveform thus may take values in the ternary alphabet $\{A_{low}, 0, A_{high}\}$, may be further extended to a class of fourth proposed mappings, for which the output waveform takes values in the binary alphabet $\{A_{low}, A_{high}\}$. Thus for the class of fourth proposed mappings each user bit $u_k$, $u_k \in \{-1,+1\}$, from a string of user bits u, is mapped onto a group of two channel symbols $(z_{k,1}, z_{k,2})$, where $z_{k,1}, z_{k,2} \in \{-1,+1\}$. Hence, whereas the first and second proposed mappings generally require three light output levels, the fourth proposed mapping generally require only two light output levels; for the first and second proposed mappings the waveform corresponding to the symbol +1 may, as disclosed above, be a pulse with high amplitude $A_{high}$, the waveform corresponding to the symbol −1 may be a pulse with low amplitude $A_{low}$, and the waveform corresponding to the symbol '0' may be a pulse with amplitude $(A_{high}+A_{low})/2$.

For the class of fourth proposed mappings the '0' symbol, which is only used for $z_{k,2}$ and hence has a non-zero support in [T/2, T), may be formed by using a combination of the high level amplitude $A_{high}$ and the low level amplitude $A_{low}$ while maintaining the fourth order low frequency power spectrum. For the '0' waveform $W_0(t)$ with support in [T/2, T] the requirements may thus be formulated as:

$W_0(t)=A_{high}$ or $W_0(t)=A_{low}$ for all $t \in [T/2,T)$ $\int (W_0(t)-(A_{high}+A_{low})/2)dt=0$ $\int t(W_0(t)-(A_{high}+A_{low})/2)dt=0$.

If the number of level changes within the symbol is limited, the number of waveforms satisfying these constraints is finite. The minimum number of level changes for a such a waveform $W_0(t)$ is two, and in that case there are two possibilities: the first possibility has $W_0(t)=A_{low}$ for $t \in [T/2, 5T/8)$ and $[7T/8, T)$ and $W_0(t)=A_{high}$ for $t \in [5T/8, 7T/8)$, the second possibility is the same as the first one, but with the high and low levels interchanged.

Denote by $W_+$ the waveform for transmitting the symbol '+1' and by $W-$ the waveform for transmitting the symbol '−1'. The symbol '0' can then be transmitted as the waveform denoted $W_{+-}$ if it is preceded by the symbol '+1' and followed by the symbol '−1', and as a different waveform denoted $W_{-+}$ if it is preceded by the symbol '−' and followed by the symbol '+'. For example, if the waveforms $W_{+-}$ and $W_{-+}$ fulfill the following conditions (which thus correspond to conditions a), b) and c) above):

$W_{+-}(t)=A_{high}$ or $W_{+-}(t)=A_{low}$ for all $t \in [T/2)$ $\int (W_{+-}(t)-(A_{high}+A_{low})/2)dt=0$ $W_{+-}(t)+W_{-+}(t)=A_{high}+A_{low}$ the power spectral density is free of delta peaks at non-zero frequencies and has a fourth order low frequency behavior.

With one level change inside each waveform $W_{+-}$ and $W_{-+}$, no level change at the transitions between the '0' symbol and the preceding symbols, and no level change at the transitions between the '0' symbol and the following symbol, $W_{+-}$ and $W_{-+}$ may be chosen as $W_{+-}(t)=A_{high}$ for all $t \in [T/2, 5T/4)$, and $W_{+-}(t)=A_{low}$ for all $t \in [5T/4,T)$ $W_{-+}(t)=A_{low}$ for all $t \in [T/2, 5T/4)$, and $W_{-+}(t)=A_{high}$ for all $t \in [5T/4,T)$.

Figure 7F:
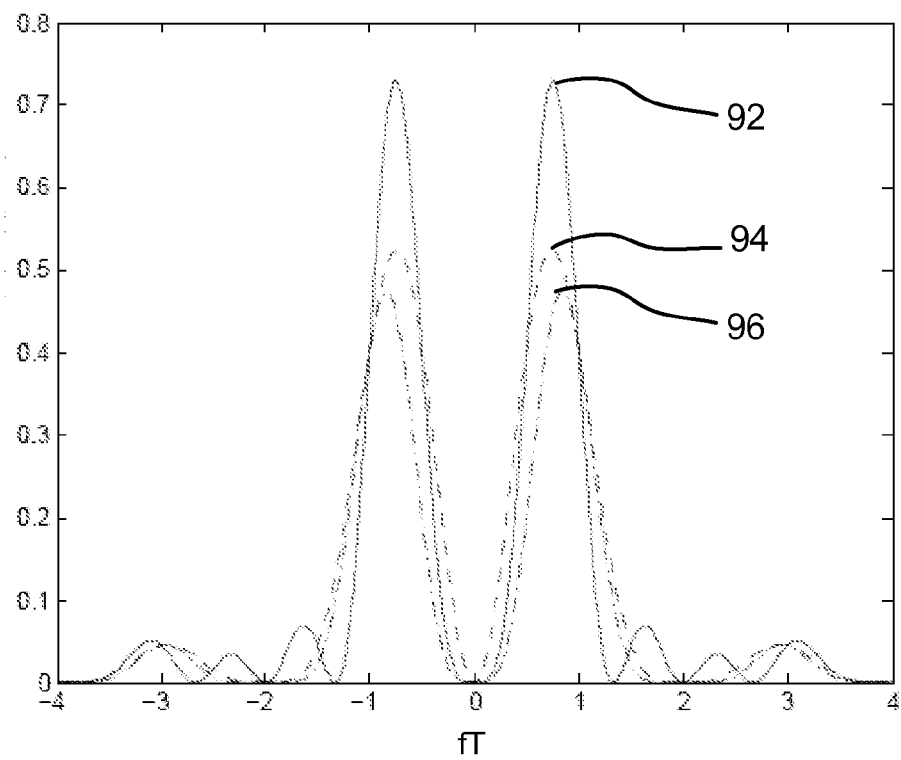
Figure 7G:
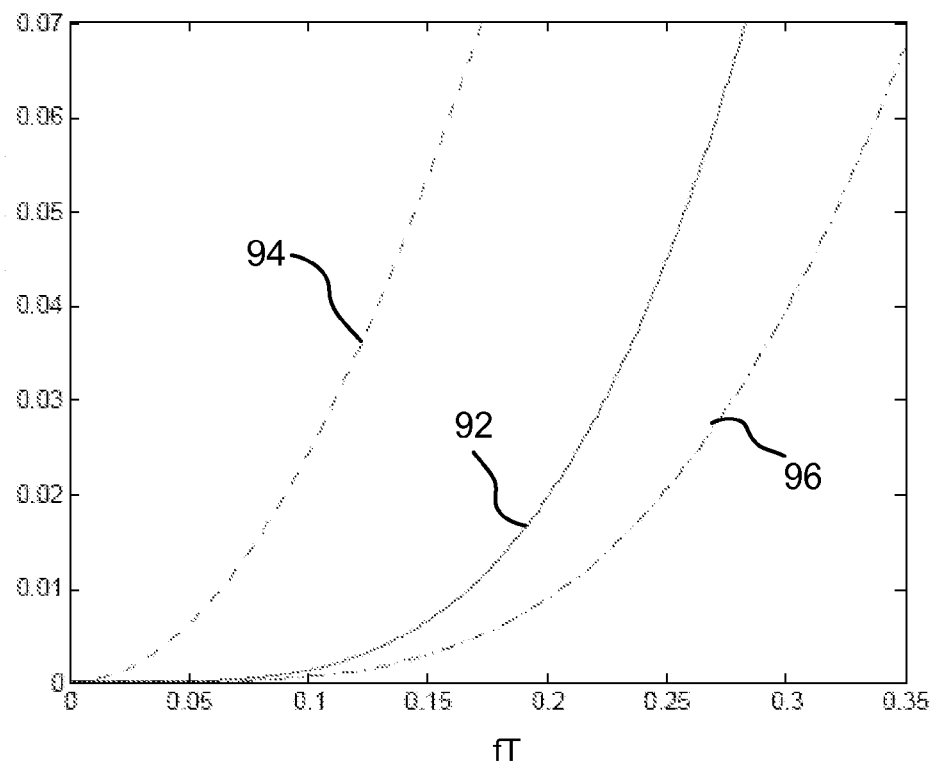

Thus $z_{k,2}$ is represented either by $W_{+-}$ or $W_{-+}$ depending on the values of $u_k$ and $u_{k+1}$. If $u_k=+1$ and $u_{k+1}=-1$ then $z_{k,2}$ is represented by $W_{+-}$ and vice versa. Further, since $W_{+-}$ and $W_{-+}$ change levels, each $z_{k,2}$ will also change levels and according to the above consist of two sub-parts; for $W_{+-}$ a first sub-part having the value $A_{high}$ and a second sub-part having the value $A_{low}$, and for $W_{-+}$ a first sub-part having the value $A_{low}$ and a second sub-part having the value $A_{high}$. At reference numeral 92 of FIGS. 7f-7g, where FIG. 7g gives a zoomed-in version around zero frequency of the plot in FIG. 7f, the PSD for the fourth proposed mapping is compared to the Manchester (bi-phase) mapping at reference numeral 94 and the first proposed mapping at reference numeral 96 for equal user bit rate. As can be seen in FIGS. 7f-7g the fourth proposed mapping has a more narrow gap around DC (zero frequency) than the first proposed mapping but still wider than the Manchester (bi-phase) mapping.

Using two different waveforms for the intermediate symbols (i.e. the '0' symbols) can also be applied for the class of second proposed mappings. Particularly, if the ternary symbol $z_{k,2}$ to be inserted between $z_{k,1}^{N-1}$ and $z_{k+1,1}^{1}$ is '0', (i.e., if $u_{k+1}=(-1)^N u_k$) the waveform $W_{+-}$ can be used if $z_{k+1,1}^{1}=-1$ and the waveform $W_{-+}$ can be used if $z_{k+1,1}^{1}=1$.

For the third class of proposed mappings $z_{k,2}$ can according to the above take on $3^L$ different values, some of which are larger than +1 or smaller than −1. The symbol values $z_{k,1}$ and $z_{k,2}$ of the third class of proposed mappings may be scaled so that they all lie in the interval [−1,1]. As an example, for L=2 the possible values become −1, −9/10, −4/5, −1/10, 0, 1/10, 4/5, 9/10, 1 for $z_{k,2}$ and −4/5, +4/5 for $z_{k,1}$. A waveform representing the symbol value z may be formed by using the high level for a fraction (1+z)/2 of the symbol time and the low level for a fraction (1−z)/2 of the symbol time. Furthermore, for the $z_{k,2}$ symbols, the three 'high' symbol values 4/5, 9/10 and 1 can occur only between a pair of $(z_{k,1}, z_{k+1,1})$ symbols equal to (−4/5, −4/5), so for the high symbol values the waveform may preferably start and end 'high' and have a 'low' part in the middle. Similarly, the waveforms for the three low symbol values −1, −9/10 and −4/5 can start and end 'low' and have a 'high' part in the middle. The three 'middle' symbol values −1/10, 0, 1/10 can only occur between a pair (−4/5, 4/5) or (4/5,−4/5), so for these symbols it may be preferable to have two different waveforms; the first waveform starting 'low' and ending 'high', the other waveform starting 'high' and ending 'low', and wherein the waveform which matches the neighboring signal levels is used.

In general, both Manchester encoding and encoding based on the first proposed mapping allow for a simple threshold receiver, based on the matched filters:

$\hat{u}_k=\text{sign}(z_{k,1}-z_{k,2})$ and $\hat{u}_k=\text{sign}(z_{k,1}-(z_{k-1,2}+z_{k,2})/2)$ respectively, where the $z_k$ in the right-hand-side indicates the received values in the information decoder 4. The low frequency rejection of these filters is directly related to the power spectra of the corresponding signals. A simple implementation of the decoder for the first proposed mapping may thus comprise an integrate- and dump filter for each received channel symbol z. A hard-decision decoder may thus compute the expression $$(z_{k,1} - (z_{k-1,2} + z_{k,2})/2)$$

and compare the result with threshold 0 for deciding between a transmitted +1 or −1 (i.e. whether $u_k$=+1 or $u_k$=−1). From this and the above the skilled person understands how a matched threshold receiver may be implemented for the second and third proposed mappings, respectively. Particularly, the matched filter threshold receiver for the third proposed mapping may be expressed as $$\hat{u}_k = \text{sign}\left(z_{k,1} - \sum_{l=1}^{L} a_{L,l} \cdot \frac{z_{k-1,2} + z_{k+1-1,2}}{2}\right)$$

where the z-values at the right-hand-side are the measured values of these symbols at the receiver.

The above expression $(z_{k,1} - (z_{k-1,2} + z_{k,2})/2)$ for the first proposed mapping corresponds to the output of a receiver having a matched filter with filter coefficients [−1/2, 1, −1/2]. Similarly, the matched filters corresponding to the proposed second class of mapping may have the following sets of coefficients:

N=1: [−1/2, 1, −1/2]
N=2: [−1/2, 1, −1, 1/2]
N=3: [−1/2, 1, −1, 1, −1/2]
N=4: [−1/2, 1, −1, 1, −1, 1/2]

and so on (as noted above, for N=1 the second class of mapping corresponds to the first mapping).

In general terms a matched filter based receiver convolves the filter coefficients with the received waveform and then outputs the values at the sample moments. If a user bit $u_k$ is preceded and followed by user bits with the same value, the symbols preceding and following the symbol corresponding to the bit have the opposite value, so the convolution with the matched filter gives $u_k \cdot (A_{high} - A_{low}) \cdot T/2$. If one of the neighboring bits has the opposite sign, one of the neighboring symbols is '0' and the output of the matched filter is $(3/4) \cdot u_k \cdot (A_{high} - A_{low}) \cdot T/2$. Further, if both neighboring bits have the opposite sign, the output of the matched filter is $(1/2) \cdot u_k \cdot (A_{high} - A_{low}) \cdot T/2$.

A receiver for the fourth proposed mapping may also be based on a matched filter. Particularly, the above matched filter threshold receiver for the first proposed mapping may also be used for the fourth proposed mapping with good results. In general terms, for optimal decoding of the fourth mapping, the receiver needs to consider the signal levels in both halves of the symbol of the waveform representing the symbol $z_{k,2}$ (for all k), i.e. the symbols that can represent '0'. Denote the first half of $z_{k,2}$ by $z_{k,2,L}$ and the second half of $z_{k,2}$ by $z_{k,2,R}$. In other words $z_{k,2,L}$ corresponds to $z_{k,2}$ for t∈[T/2, 5T/4) and $z_{k,2,R}$ corresponds to $z_{k,2}$ for t∈[5T/4, T) within each interval [0, T). Then the decoding of $u_k$ involves taking linear combinations of the $z_{l,1}$, $z_{l,2,L}$ and $z_{l,2,R}$ for values of l in the neighborhood of k. Particularly, the matched filter for the for the fourth proposed mapping may preferably have an impulse response corresponding to the filter coefficients [−1, 0, +1, +1, 0, −1], and hence be divided into six blocks, each having duration T/4. Thus for these filter coefficients the output is independent of the value of the neighboring bits.

The filter coefficients of the matched filter for the fourth proposed mapping may also be used in the matched filter based receiver for the first proposed mapping. Using the filter coefficients of the matched filter for the fourth proposed mapping in the matched filter based receiver for the first proposed mapping may, for user bits which are detected by taking the sign of the matched filter output, reduce the probability of misdetection due to additive noise if one or both of the neighboring user bits have the opposite sign. Particularly, for the class of second proposed mappings the matched filters may have the following sets of coefficients in terms of the 'half symbols':

N=1: [−1,0,1,1,0,−1]
N=2: [−1,0,1,1,−1,−1,0,1]
N=3: [−1,0,1,1,−1,−1,1,1,0,−1]
N=4: [−1,0,1,1,−1,−1,1,1,−1,−1,0,1]

and so on (as noted above, for n=1 the second class of mappings corresponds to the first mapping). Thus, in general the matched filter may have 2N+4 coefficients in terms of the 'half symbols'. The coefficients may start with the sequence [−1,0]. This start sequence may then be followed by N pairs of coefficients alternating between [1,1] and [−1,−1] until the N-th pair which equals $[(-1)^{N-1}, (-1)^{N-1}]$. The coefficients may then end with the sequence $[0, (-1)^N]$. A receiver may use either filter for decoding either mapping, with the same value of N, of course. The filters for the fourth mapping are equally good or better than the filters for the first or second mappings. Detection for the scaled third class of proposed mappings may require higher timing accuracy (such as oversampling at the detector) than for the originally proposed third class of mappings. However, the matched filter for the amplitude based L=2 system can be used in the detector for the above scaled symbols, thereby reducing the timing accuracy requirements.

Figure 4A:
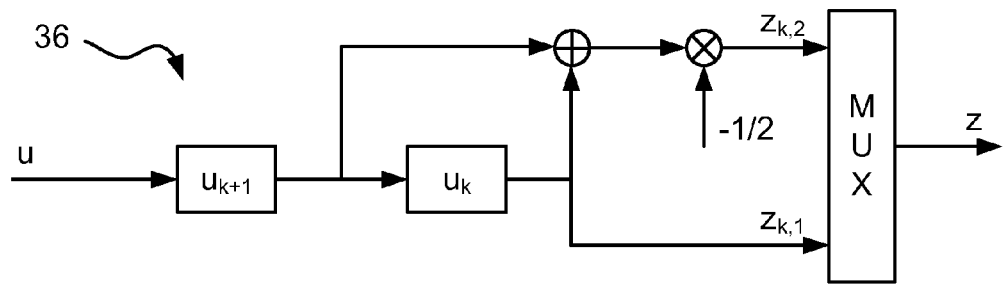
FIGS. 4a-4c illustrate shift register encoders according to embodiments.

Both encoder (i.e. the mapping process) and decoder (i.e. the inverse mapping process) may be implemented using shift registers. FIG. 4a illustrates at reference numeral 36 a shift register implementation of an encoder based on the first proposed mapping. The source sequence u is fed into a shift register having two memory cells, one for storing $u_{k+1}$ and one for storing $u_k$. $z_{k,1}$ is directly obtained from $u_k$. $z_{k,2}$ is obtained by first adding $u_k$ and $u_{k+1}$ and then multiplying this sum with a factor −1/2. $z_{k,1}$ and $z_{k,2}$ are then serialized in a multiplexer (mux) to form the final sequence z of channel symbols.

Figure 4B:
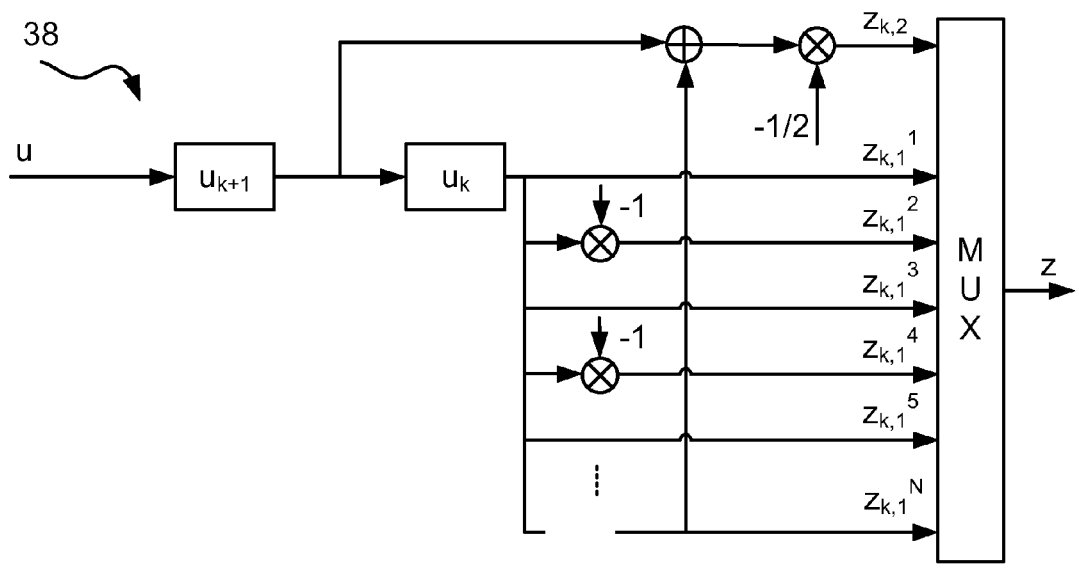

FIG. 4b illustrates at reference numeral 38 a shift register implementation of an encoder based on the second proposed mapping. The source sequence u is fed into a shift register having two memory cells, one for storing $u_{k+1}$ and one for storing $u_k$. $z_{k,1}$ is formed as a sequence $z_{k,1}=[z_{k,1}^1, \ldots, z_{k,1}^n, \ldots, z_{k,1}^N]$, where each $z_{k,1}^n$ is obtained from a sequence of alternated signed $u_k$; $z_{k,1}^n = u_k$ if n is odd and $z_{k,1}^n = -u_k$ if n is even. In other words, in order to obtain $z_{k,1}^n$, $u_k$ is either multiplied with +1 (i.e. no operation needed) or with −1. The resulting sequence $z_{k,1}=[z_{k,1}^1, \ldots, z_{k,1}^n, \ldots, z_{k,1}^N]$ is then fed into a multiplexer (mux). $z_{k,2}$ is obtained by first adding $z_{k,1}^N$ and $u_{k+1}$ and then multiplying this sum with a factor −1/2. $z_{k,1}$ and $z_{k,2}$ are then serialized in the multiplexer to form the final sequence z of channel symbols.

Figure 4C:
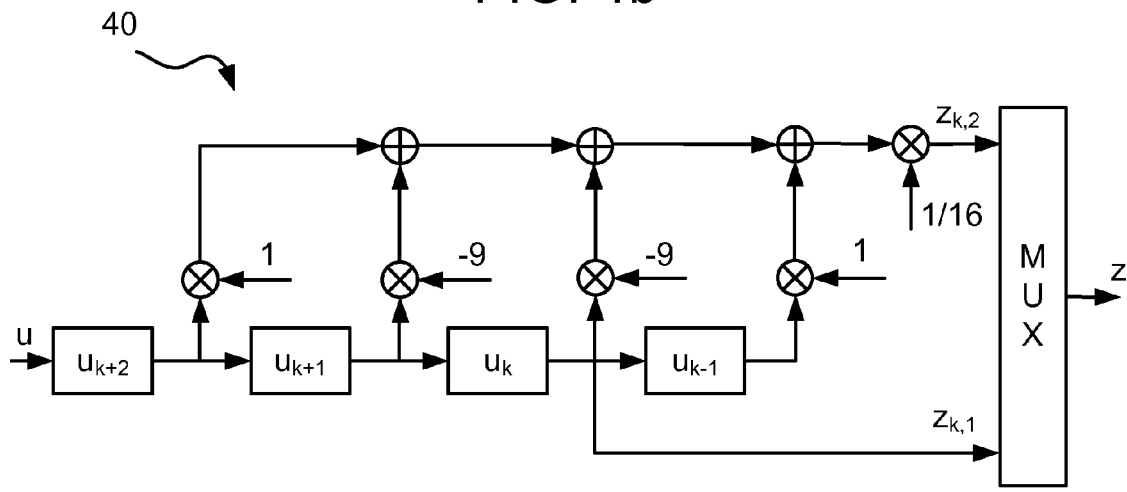

FIG. 4c illustrates at reference numeral 40 a shift register implementation of an encoder based on the third proposed mapping. For L=2 the source sequence u is fed into a shift register having four memory cells for storing $u_{k+2}$, $u_{k+1}$, $u_k$ and $u_{k-1}$, respectively. $z_{k,1}$ is directly obtained from $u_k$. $z_{k,2}$ is obtained from a weighted sum of $u_{k+2}$, $u_{k+1}$, $u_k$ and $u_{k-1}$, respectively. As noted above the weighting factors for L=2 are 1/16, −9/16, −9/16 and 1/16, respectively. Thus, according to a first implementation $u_{k+2}$, $u_{k+1}$, $u_k$ and $u_{k-1}$ are first multiplied with 1, −9, −9, and 1, respectively, then added and then multiplied with a factor 1/16 to obtain $z_{k,2}$. Alternatively $z_{k,2}$ can be found by using by directly multiplying $u_{k+2}$, $u_{k+1}$, $u_k$ and $u_{k-1}$ with 1/16, −9/16, −9/16 and 1/16, respectively, thus removing the need for the extra multiplier. $z_{k,1}$ and $z_{k,2}$ are then serialized in a multiplexer (mux) to form the final sequence z of channel symbols.

Figure 5:
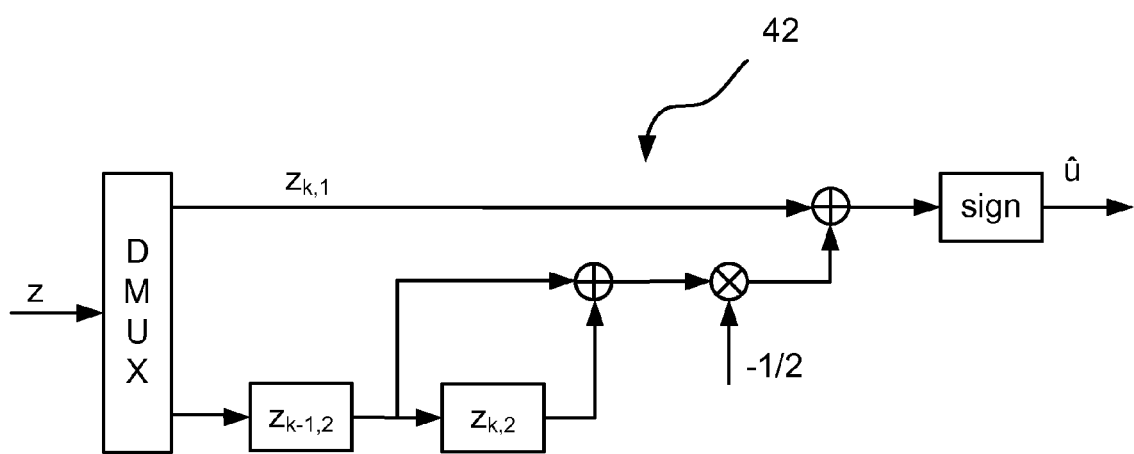
FIG. 5 illustrates a shift register decoder according to an embodiment.

FIG. 5 illustrates at reference numeral 42 a shift register implementation of a decoder based on the first proposed mapping. The received channel sequence z is fed to a demultiplexer (dmux) to obtain $z_{k,1}$ and $z_{k,2}$. $z_{k,2}$ is fed into a shift register having two memory cells, one for storing $z_{k-1,2}$ and one for storing $z_{k,2}$. $z_{k-1,2}$ and $z_{k,2}$ are added and multiplied with a factor −1/2. the estimated source sequence û is then obtained by adding the result of this multiplication with $z_{k,1}$ and then taking the sign of the sum.

Figure 6A:
FIGS. 6a-e illustrate pulse trains for source symbols and channel symbols according to embodiments.
Figure 6B:
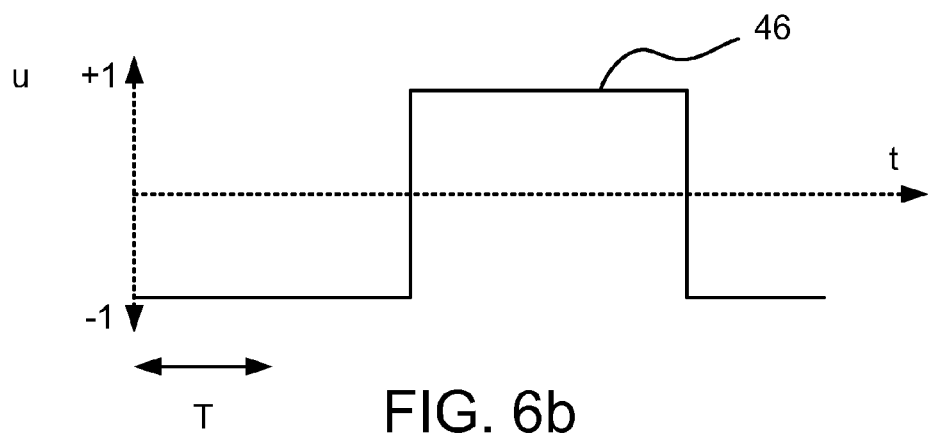
Figure 6C:
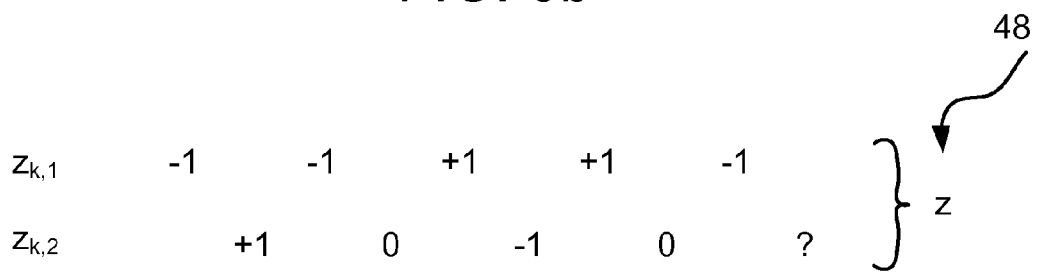
Figure 6D:
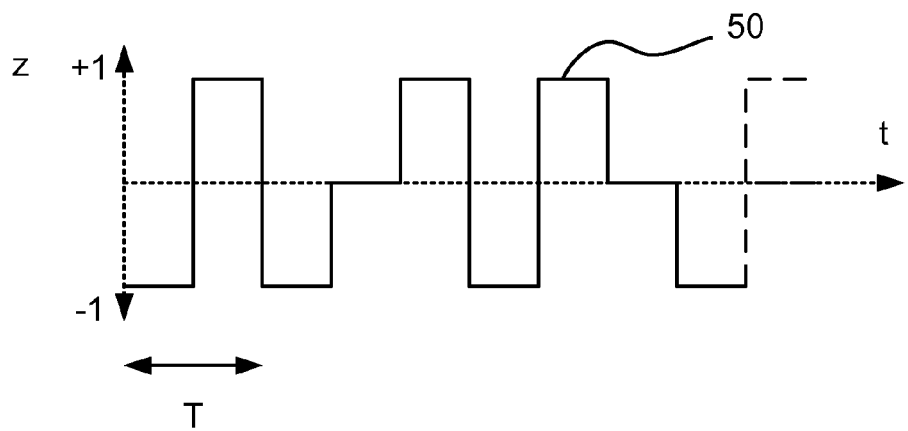

FIGS. 6a-d give an example of an application of the first proposed mapping. FIG. 6a illustrates at reference numeral 44 a source sequence u=[−1, −1, +1, +1, −1, . . . ] which inter alia may represent the information sequence [0, 0, 1, 1, 0, . . . ]. A waveform representation for the source sequence u is illustrated at reference numeral 46 in FIG. 6b where each source bit has a time duration of T seconds. For illustrative purpose only the amplitude of the waveform is confined to the interval from −1 to +1, but in general it may be from −A to +A if amplitude modulation with amplitude A is used. As the skilled person understands, other modulation methods than amplitude modulation are equally possible. FIG. 6c illustrates at reference numeral 48 the corresponding sequence of channel symbols z, i.e. z=[−1, +1, −1, 0, +1, −1, +1, 0, −1, ?, . . . ], where "?" is either "0" or "+1" depending on the next source symbol. A waveform representation for the channel sequence z is illustrated at reference numeral 50 in FIG. 6d. Thus the mapping is similar to bi-phase if consecutive user bits are the same. However, if two consecutive user bits are not the same, the first proposed mapping produces a "0" as merging bit $z_{k,2}$, which leads to a smooth transition of the transmitted waveform, thus preventing the generation of frequencies that are "far away" from a quasi carrier frequency (500 Hz in the example above).

Figure 6E:
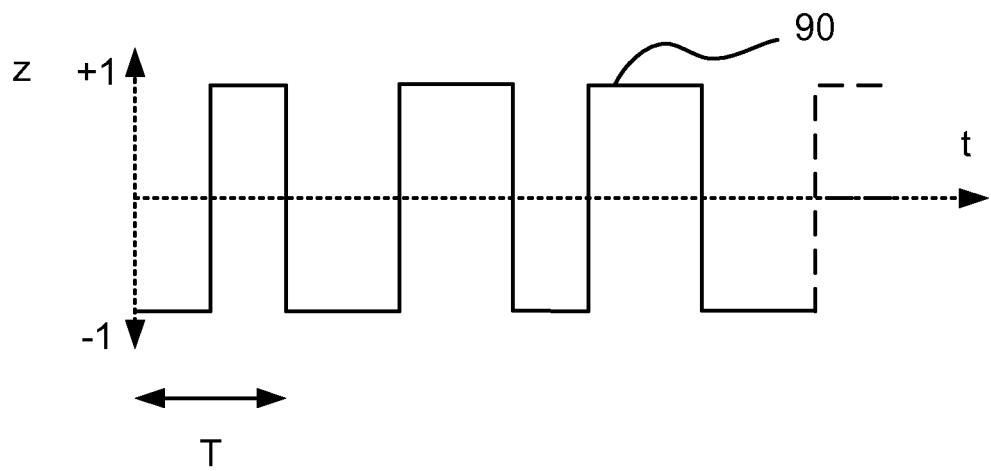

FIG. 6e gives an example of an application of the fourth proposed mapping used for the same example as for FIGS. 6a-d, i.e., for a source sequence u=[−1, −1, +1, +1, −1, . . . ] which inter alia may represent the information sequence [0, 0, 1, 1, 0, . . . ]. A waveform representation for the channel sequence z for the fourth proposed mapping is illustrated at reference numeral 90 in FIG. 6e. The waveform representation is similar to that of the first proposed mapping illustrated in FIG. 6d. However, if two consecutive user bits $u_k$, $u_{k+1}$ are not the same, the fourth proposed mapping does not produce a '0' as merging bit $z_{k,2}$, but instead produces either $W_{+-}$ (if it is preceded by the symbol '+1' and followed by the symbol '−1') or $W_{-+}$ (if it is preceded by the symbol '−1' and followed by the symbol '+1'), where $W_{+-}$ and $W_{-+}$ are defined according to the above, and where for the present example $A_{high}$='+1' and $A_{low}$='1'.

The application of the proposed mappings is suitable for visible light communication (VLC) between lamps or between lamps and a remote control. In terms of an OSI stack defining such a communication, it would form part of the definition of the physical layer. The person skilled in the art realizes that the present invention by no means is limited to the preferred embodiments described above. On the contrary, many modifications and variations are possible within the scope of the appended claims.

For example, although the disclosed embodiments have been illustrated in the context of a coded light environment, the proposed mappings are applicable to general data transmission and information communications, such as radio communications. The disclosed light driver may then be replaced with a driver arranged to drive a radio transmitter. Similarly the information decoder may be arranged to decode an information sequence from a received radio signal. Further, the different levels involved in the individual channel symbols have been mapped onto the amplitude of the transmitted light level. Those levels may be mapped onto a pulse width modulation scheme (which may also be suitable for an LED based VLC system). The proposed schemes may even be implemented in such a manner that the information decoder does not have to be aware of which system (amplitude modulation or pulse width modulation) is used at the transmitter.

The invention claimed is:

1. A light driver for driving at least one light source arranged to emit coded light based on a control signal, the light driver comprising:
 a receiver arranged to receive a sequence u=[u1, . . . , uk, . . . , uK] of source symbols uk representing an information sequence of an information source;
 a processing unit arranged to determine, from the sequence of source symbols, a sequence z=[z1, . . . , zk, . . . , zK] of channel symbols zk forming the control signal;
 a transmitter arranged to provide the at least one light source with the control signal thereby driving the at least one light source;
 wherein the processing unit is arranged to determine the sequence of channel symbols z by mapping each source symbol uk at time k to a composite channel symbol zk=(zk,1, zk,2) comprising at least one first channel symbol zk,1, one of which is identical to uk, and at least one second channel symbol zk,2 having a value chosen from a set M, wherein the value of zk,2 is determined according to a weighting function having the source symbol uk and at least one future and/or past source symbol ui, i≠k as input arguments, the weighting function comprising at least two non-zero weighting factors, the mapping resulting in that the power spectral density at frequency zero of the sequence z of channel symbols is equal to zero, and wherein
 the control signal thereby enables no visible flicker to be present in coded light emitted by the at least one light source.

2. The light driver according to claim 1, wherein the number of elements in the set M is odd.

3. The light driver according to claim 1, wherein the set M is symmetric around zero.

4. The light driver according to claim 1, wherein a zero element is included in the set M.

5. The light driver according to claim 1, wherein zk,2 is a signed summation of weighted averages of L terms uk−l+1+uk+1 for l=1, . . . L, resulting in that the power spectral density of the sequence z of channel symbols decays as (fT)(4L), where f denotes frequency in Hz and where T denotes the time in seconds for transmitting uk.

6. The light driver according to claim 5, wherein a weighting factor $a_{L,l}$ for the L terms is determined such that $$1 - \sum_{l=1}^{L} a_{L,l}\cos((2l-1)\pi fT) = O((fT)^{2L})$$

holds.

7. The light driver according to claim 6, wherein the weighting factor $a_{L,l}$ is further determined such that $$A^2 T \left( \frac{1}{2} \left( 1 - \sum_{l=1}^{L} a_{L,l} \cos((2l-1)\pi fT) \right) \operatorname{sinc}(fT/2) \right)^2 = O((fT)^{4L})$$

holds for amplitude modulation with amplitude A of the sequence of channel symbols.

8. The light driver according to claim 6, wherein zk,2=−(uk+uk+1)/2.

9. The light driver according to claim 6, wherein the at least one first channel symbol zk,1 is a sequence of first channel symbols, zk,1=[zk,11 ... zk,1j ... zk,1N] where the j:th symbol is given by zk,1j=(−1)j−1uk, for j=1, ..., N, and wherein zk,2=−(zk,1N+zk+1,11)/2.

10. A luminaire comprising at least one light source, modulation means and a light driver according to claim 6, the modulation means being arranged to modulate, according to the control signal provided by the light driver, coded light to be emitted by the at least one light source.

11. An information decoder for decoding an information sequence from a signal received from a light detector, the signal being indicative of coded light as emitted from at least one light source driven by a light driver according to claim 6, comprising:
  a receiver arranged to receive the signal from the light detector, the signal being indicative of the sequence z=[z1, ..., zk, ..., zK] of channel symbols zk=(zk,1, zk,2);
  a processing unit arranged to determine, from the signal, a sequence û=[û1, ..., ûk, ..., ûK] of decoded source symbols ûk forming the decoded information sequence;
  wherein the processing unit is arranged to determine the sequence of decoded source symbols û whereby the decoded source symbol ûk is determined from a difference between zk,1 and a weighted average of at least the channel symbol zk,2 and one future and/or past channel symbol zi, i≠k.

12. The information decoder according to claim 11, wherein the processing unit comprises a hard decision decoder, and wherein the hard decision decoder is arranged to determine the sequence of decoded source symbols û as the sign of said difference.

13. The information decoder according to claim 11, wherein ûk is determined according to ûk=sign (zk,1−(zk−1,2+zk,2)/2).

14. The information decoder according to claim 11, wherein $\hat{u}_k$ is determined according to $$\hat{u}_k = \operatorname{sign}\left( z_{k,1} - \sum_{l=1}^{L} a_{L,l} \frac{z_{k-1,2} + z_{k+1-1,2}}{2} \right).$$

15. An information decoder for decoding an information sequence from a signal received from a light detector, the signal being indicative of coded light as emitted from at least one light source driven by a light driver according to claim 6, comprising:
  a receiver arranged to receive the signal from the light detector, the signal being indicative of the sequence z=[z1, ..., zk, ..., zK] of channel symbols zk=(zk,1, zk,2);
  a processing unit arranged to determine, from the signal, a sequence û=[û1, ..., ûk, ..., ûK] of decoded source symbols ûk forming the decoded information sequence;
  wherein the processing unit is arranged to determine the sequence of decoded source symbols û whereby the decoded source symbol ûk is determined by taking linear combinations of zl,1, and half symbols zl,2,L and zl,2,R, for values of l denoting a set of channel symbols from said sequence z, where zk,2,L is the first half of zk,2 and zk,2,R is the second half of zk,2.

16. The information decoder according to claim 15, wherein the processing unit is arranged to determine the sequence of decoded source symbols û by using a matched filter having a set of coefficients comprising the sequence [−1,0,1,1].

17. The information decoder according to claim 15, wherein the matched filter has 2N+4 coefficients, starting with the sequence [−1,0], followed by N pairs of coefficients alternating between [1,1] and [−1,−1] until the N-th pair which equals [(−1)N−1, (−1)N−1], and ending with the sequence [0, (−1)N].

18. A method for driving at least one light source arranged to emit coded light based on a control signal, the method comprising:
  receiving a sequence u=[u1, ..., uk, ..., uK] of source symbols uk representing an information sequence of an information source;
  determining a sequence z=[z1, ..., zk, ..., zK] of channel symbols zk forming the control signal from the sequence of source symbols;
  providing the at least one light source with the control signal, thereby driving the at least one light source;
  wherein the sequence of channel symbols z is determined by mapping each source symbol uk at time k to a composite channel symbol zk=(zk,1, zk,2) comprising at least one first channel symbol zk,1, one of which is identical to uk, and at least one second channel symbol zk,2 having a value chosen from a set M, wherein the value of zk,2 is determined according to a weighting function having the source symbol uk and at least one future and/or past source symbol ui, i≠k as input arguments, the weighting function comprising at least two non-zero weighting factors, the mapping resulting in that the power spectral density at frequency zero of the sequence z of channel symbols is equal to zero, and wherein
  the control signal thereby enables no visible flicker to be present in coded light emitted by the at least one light source.

\* \* \* \* \*